(12) United States Patent
Takita et al.

(10) Patent No.: US 6,189,791 B1
(45) Date of Patent: *Feb. 20, 2001

(54) MAGNETIC CARD READER AND METHOD FOR DETERMINING THE COERCIVE FORCE OF A MAGNETIC CARD THEREIN

(75) Inventors: Yukihiko Takita; Akira Nakazawa; Eiji Imai; Masahiro Ikeda, all of Nagano (JP)

(73) Assignee: Sankyo Seiki MFG Co., Ltd., Nagano-ken (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/151,338

(22) Filed: Sep. 11, 1998

(30) Foreign Application Priority Data

Sep. 19, 1997 (JP) .................................. 9-254954
Sep. 19, 1997 (JP) .................................. 9-254961

(51) Int. Cl.[7] .............................. G06K 7/08; G06K 19/06
(52) U.S. Cl. ........................................ 235/449; 235/493
(58) Field of Search ................................ 235/380, 493, 235/427, 449; 360/2

(56) References Cited

U.S. PATENT DOCUMENTS

| | | | |
|---|---|---|---|
| 4,249,167 | * 2/1981 | Purinton et al. | 340/572 |
| 4,977,040 | * 12/1990 | Yano et al. | 428/692 |
| 5,414,567 | * 5/1995 | Amada et al. | 360/19.1 |
| 5,648,160 | * 7/1997 | Kishimoto et al. | 428/328 |
| 5,720,500 | * 2/1998 | Okazaki et al. | 383/82 |
| 5,798,896 | * 8/1998 | Araki et al. | 360/13 |

FOREIGN PATENT DOCUMENTS

| | | |
|---|---|---|
| 2-046504 | 2/1990 | (JP) . |
| 3-229391 | 10/1991 | (JP) . |
| 5-054217 | 9/1993 | (JP) . |

* cited by examiner

Primary Examiner—Thien M. Le
(74) Attorney, Agent, or Firm—Reed Smith LLP

(57) ABSTRACT

A magnetic card reader comprises a card insertion slot, a magnetic head for regenerating or recording magnetic information formed on a card to be inserted in the cart insertion slot and a determining device to determine coercive force of a data track for recording magnetic information of the card. A method for determining the coercive force of a magnetic card in a magnetic card reader in which magnetic information formed on a card to be inserted from a card insertion slot is regenerated or recorded by a magnetic head comprises the steps of providing a detecting portion which detects a change in static characteristics of the magnetic head and determining the coercive force of a data track by comparing output from the detecting portion, which detects a change in static characteristics of the magnetic head while being positioned across from the card, with a reference signal.

16 Claims, 10 Drawing Sheets

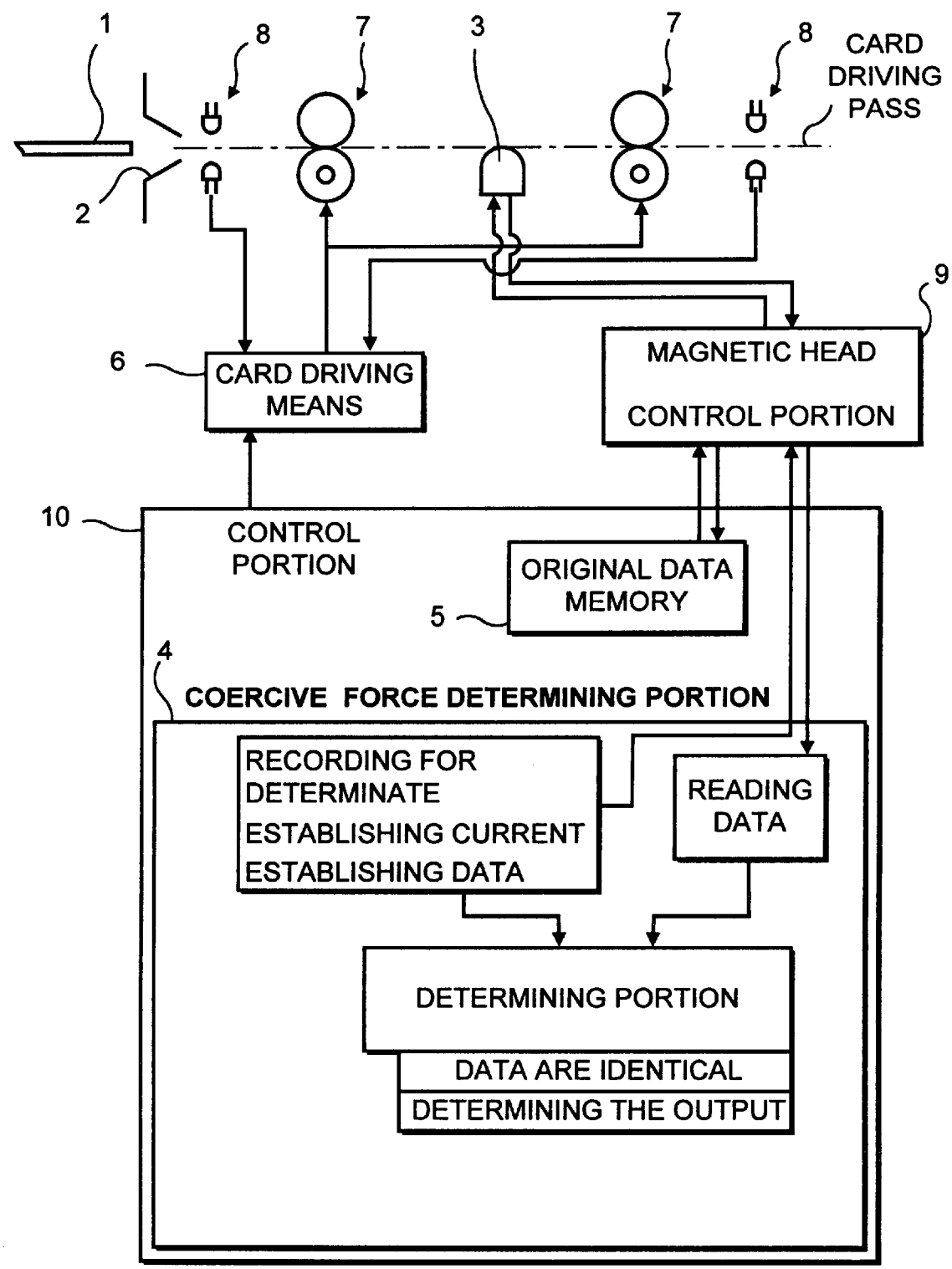
F I G. 1

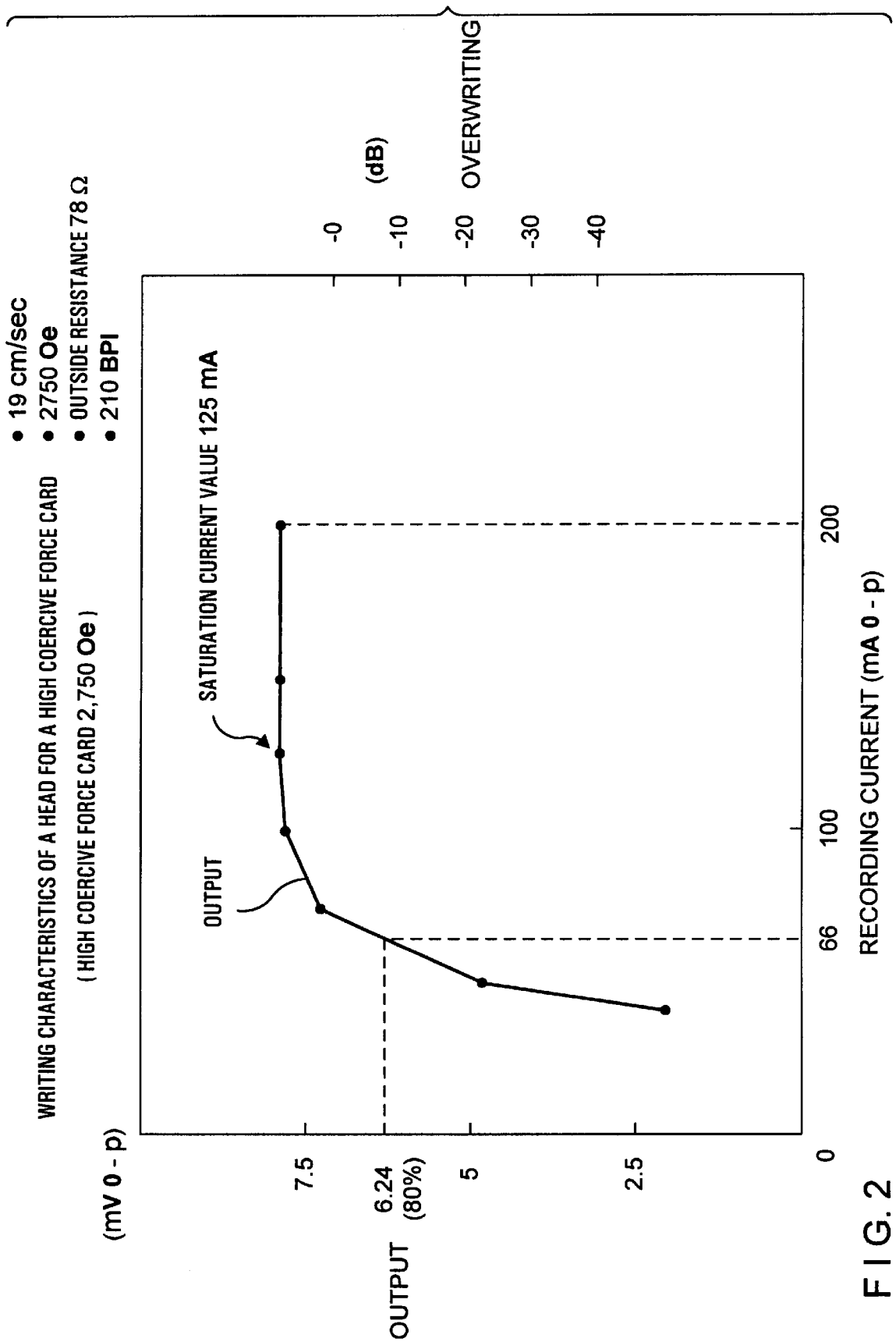
F I G. 2

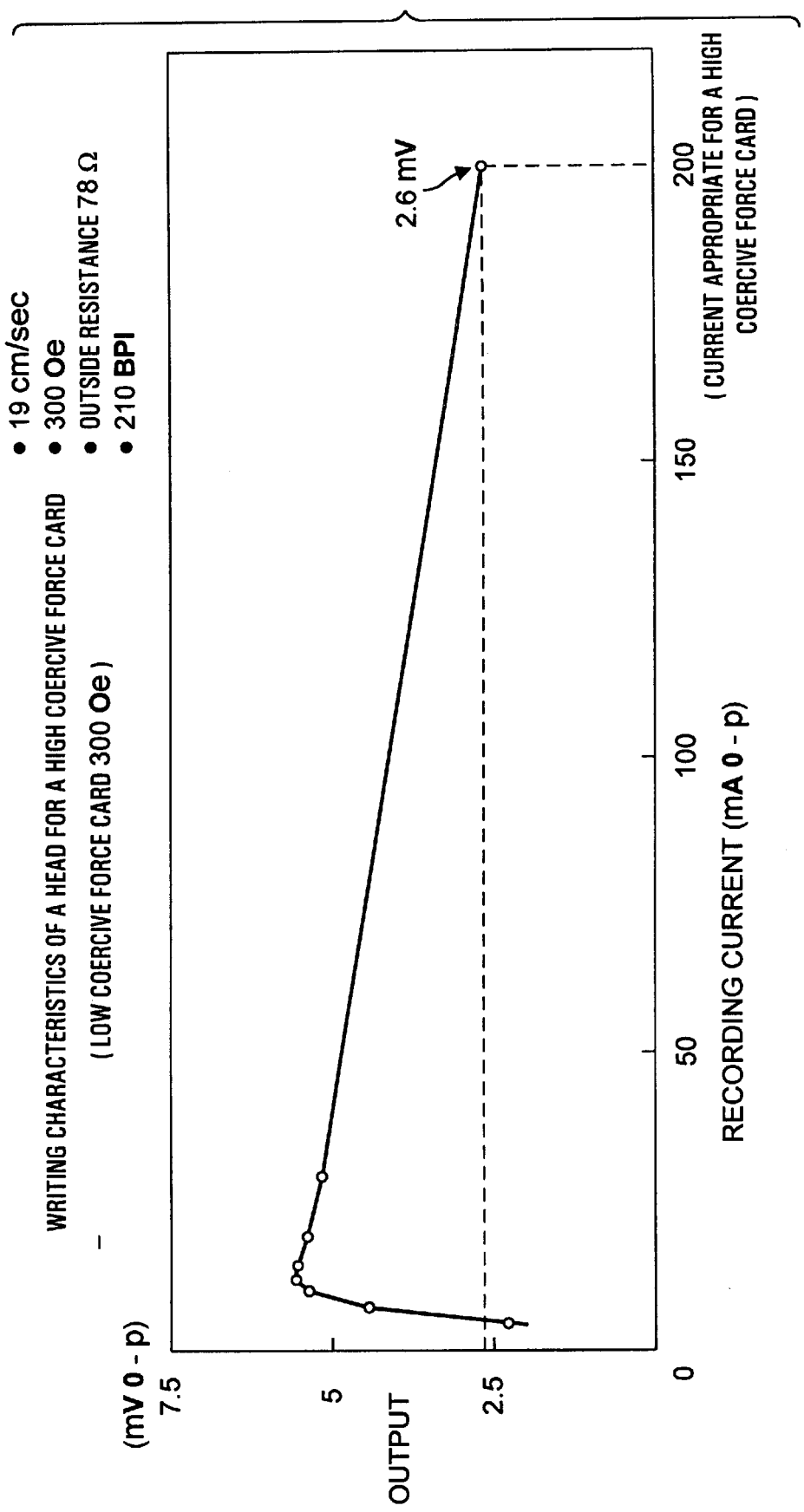
F I G. 4

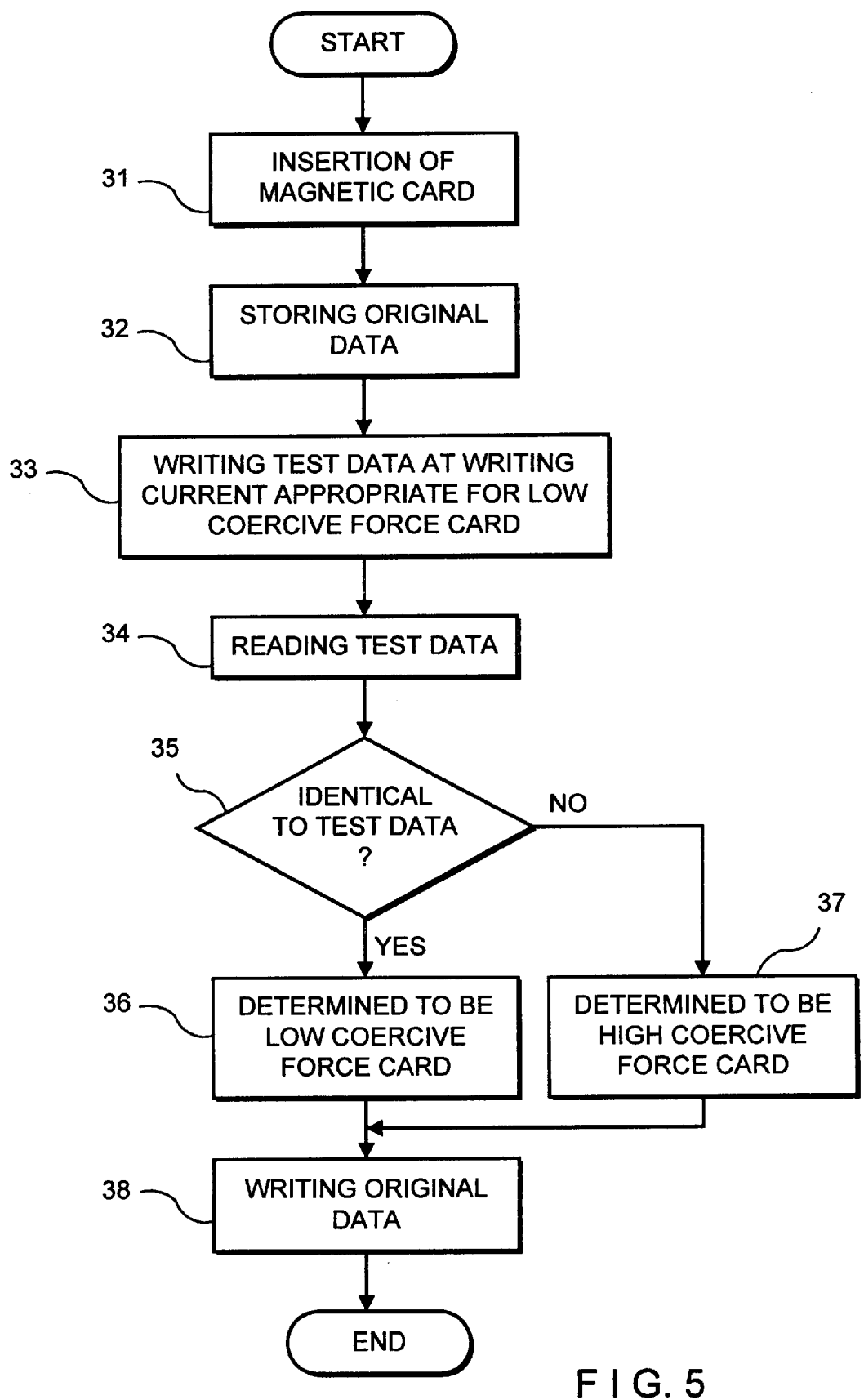
F I G. 5

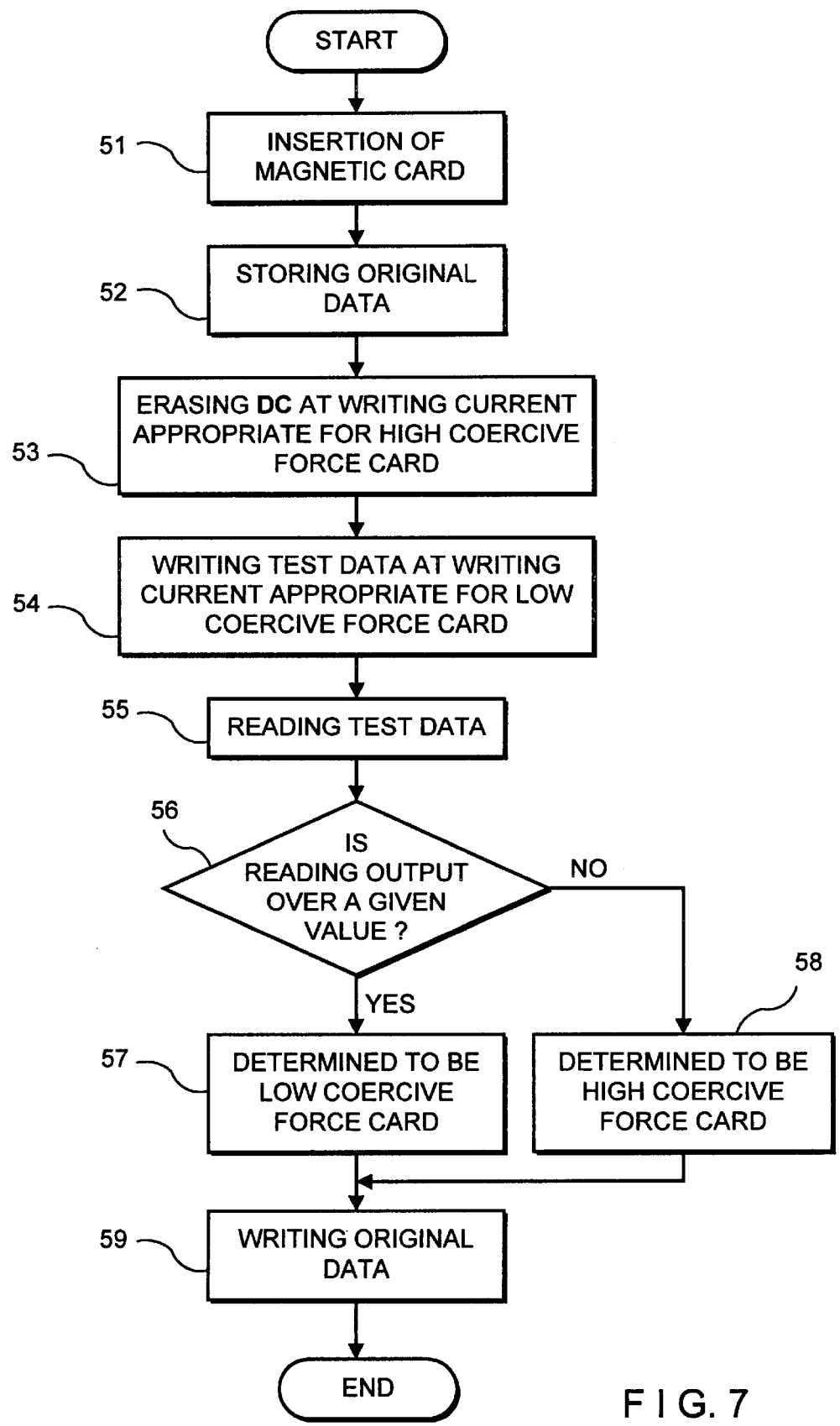
F I G. 7

MAGNETIC CARD READER AND METHOD FOR DETERMINING THE COERCIVE FORCE OF A MAGNETIC CARD THEREIN

BACKGROUND OF THE INVENTION a) Field of the Invention

The present invention relates to a magnetic card reader and a method for determining the coercive force of a magnetic card therein. More specifically, it relates to a magnetic card reader, which has a function to automatically determines whether the coercive force of a magnetic card is high or low, and a method for determining the coercive force of a magnetic card therein.

b) Description of the Related Art

In a conventional magnetic card reader, magnetic cards having identical coercive force are used. In other words, the coercive force of magnetic cards used therein is designated in advance; therefore, such a magnetic card reader is not capable of handling magnetic cards with more than two different levels of the coercive force.

Also, the coercive force is defined as a force of a magnetic field required to reverse the direction of a magnetic flux, and its unit is indicated by Oe (oersted) or A/m (ampere per meter).

In recent years, it is reported that data on a magnetic card, such as a credit card, are erased due to the effects of magnets used for clasps of purses or magnets used for driving a motor in a mechanism of a portable phone to notify receiving of a message by vibration. Therefore, it is a current tendency that the coercive force of magnetic cards be increased. For example, low coercive force cards at 300 (Oe) are tended to be altered to high coercive force cards at 2,750 (Oe). As a result, there is a possibility that both low coercive force cards and high coercive force cards may be used with the same card reader during a transition period.

In general, in the case of writing data on magnetic cards with different coercive forces, appropriate card output cannot be obtained unless appropriate writing current corresponds to the coercive force. Therefore, it is necessary to equip a magnetic card reader with a function for determining whether a magnetic card inserted from a card insertion slot is a high coercive force card or low coercive force card to establish appropriate writing current corresponding to the coercive force of the magnetic card.

OBJECT AND SUMMARY OF THE INVENTION

The present invention has, as its primary object, the provision of a magnetic card reader, which determines the coercive force of a magnetic card used therewith, and a method for determining the coercive force of a magnetic card therein.

BRIEF DESCRIPTION OF THE DRAWINGS

In the drawings:

FIG. 1 is a schematic configuration showing an embodiment of a magnetic card reader according to the present invention;

FIG. 2 is a diagram showing writing characteristics of a high coercive force card by a head for a high coercive force card;

FIG. 4 shows writing characteristics of a low coercive force card by a head for a high coercive force card in the case of an increased current value for the characteristic of FIG. 3;

FIG. 5 is a flow chart of a first embodiment of a method for determining the coercive force of a magnetic force in a magnetic card reader according to the present invention;

FIG. 7 is a flow chart of a third embodiment of a method for determining the coercive force of a magnetic force in a magnetic card reader according to the present invention;

Figure 3:
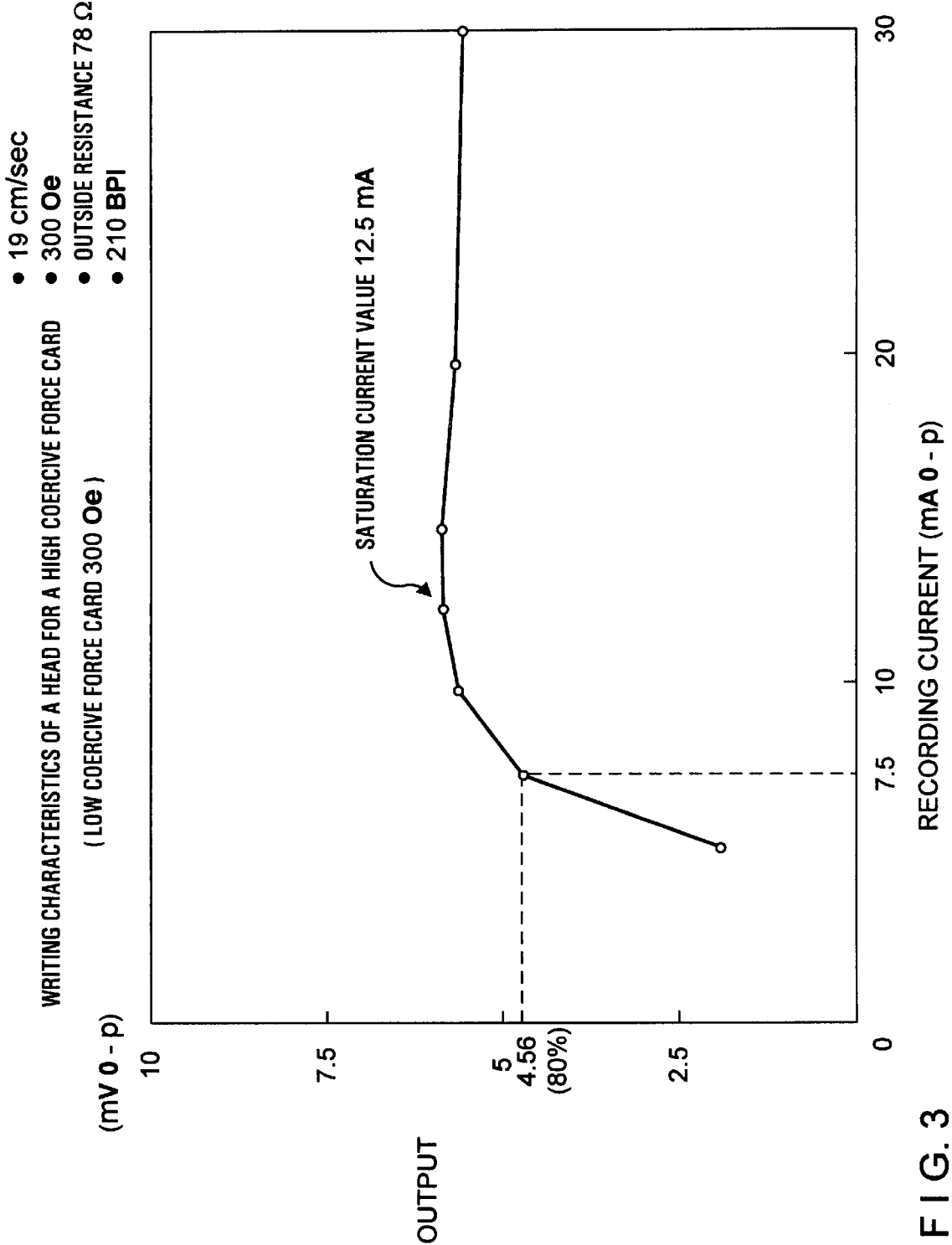
FIG. 3 is a diagram showing writing characteristics of a low coercive force card by a head for a high coercive force card.

In accordance with the invention, a magnetic card reader comprises a card insertion slot, a magnetic head for regenerating or recording magnetic information formed on a card to be inserted in the cart insertion slot and a determining device to determine coercive force of a data track for recording magnetic information of the card. Also in accordance with the invention, a method for determining the coercive force of a magnetic card in a magnetic card reader in which magnetic information formed on a card to be inserted from a card insertion slot is regenerated or recorded by a magnetic head comprises the steps of providing a detecting portion which detects a change in static characteristics of the magnetic head and determining the coercive force of a data track by comparing output from the detecting portion, which detects a change in static characteristics of the magnetic head while being positioned across from the card, with a reference signal.

DESCRIPTION OF THE PREFERRED EMBODIMENTS

The following describes a structure of the present invention in relation to drawings.

FIG. 1 shows an embodiment of a magnetic card reader of the present invention. Also, the card reader of this embodiment corresponds to a low coercive force card at 300 (Oe) and a high coercive force card at 2,750 (Oe).

The magnetic card reader is such that magnetic information formed on magnetic card 1 inserted from card insertion slot 2 is regenerated or recorded by magnetic head 3; it also comprises a determining means to determine the coercive force of a data track to record the magnetic information. The determining means comprises the coercive force determining portion which records or erases data via magnetic head 3 at a given current as well as determines the coercive force of magnetic card 1 by regenerating the data. Also, control portion 10 comprises original data memory (memory portion) 5 which stores the data already recorded on the data track prior to recording of the data at the given current.

Magnetic card 1 inserted from card insertion slot 2 is transferred by a pair of rollers 7, 7 which are driven by card driving means 6. Card driving means 6 drives the card to the right or to the left by rotating pair of rollers 7, 7 forward or backward based on signals from sensors 8, 8.

Magnetic head 3 is, for example, used for high coercive force cards at 2,750 (Oe); however, it can be used for low coercive force cards at 300 (Oe) by changing the intensity of the current. Magnetic head 3 has recording and regenerating functions and is controlled by magnetic head control portion 9. FIG. 2 shows a writing characteristic in the case of writing onto a high coercive force card with magnetic head 3. A saturation current value is 125 mA 0-p (zero peak). In general, the writing current is established at a value which is 1.5 to 3 fold of the saturation current value, considering the range of the writing ability of magnetic head 3. According to a regulation regarding ISO's test writing current of a high coercive force card, it is suggested to perform writing at a current of a value 2.5 to 3.5 fold of a current value at which the output is 80% of the saturation current value. In other words, the output at saturation is 7.8 mV such that 80% of the output at saturation is 7.8×0.8=6.24 mV. The writing current value at which this output value can be obtained is 66 mA (see FIG. 2). Also, by multiplying 66 mA by 3, 66×3=198 mA is an appropriate writing current value to write onto the high coercive force card and is determined to be about 200 mA 0-p.

On the other hand, FIG. 3 shows a writing characteristic in the case of writing onto a low coercive force card with magnetic head 3. The saturation current value is 12.5 mA. The writing current value at which the output is 80% of the saturation current value is 7.5 mA such that 7.5×3=22.5 mA 0-p is an appropriate writing current value.

FIG. 4 shows a characteristic in the case of an increased current value for the characteristic of FIG. 3. The following considers the case of writing onto a low coercive force card at a writing current appropriate for a high coercive force card. In other words, writing of the low coercive force card is performed at 200 mA 0-p, which means that the writing current is excessive such that the output is reduced to 2.6/5.7×100=46%, as shown in FIG. 4. In the case of reading magnetic card 1 with the output at 46% of the value at saturation, there is a possibility that some cards may not be suitable for data reading due to further decreased output if there is a spacing loss because of the warping of a card.

As described above, an appropriate reading output is not obtained in the case of writing onto a low coercive force card at a writing current appropriate for a high coercive force card. Similarly, an appropriate reading output is not obtained in the case of writing onto a high coercive force card at a writing current appropriate for a low coercive force card.

In other words, in the case of writing onto a low coercive force card at a writing current appropriate for a low coercive force card, the obtained output is over 90% of the value at saturation; on the other hand, in the case of writing onto the same card at a writing current appropriate for a high coercive force card, the obtained output drops to 46% of the value at saturation. Also, in the case of writing onto a high coercive force card at a writing current appropriate for a low coercive force card, data which existed before the writing remain thereon (if the data are erased in advance, there is no output); on the other hand, in the case of writing onto the same card at a writing current appropriate for a high coercive force card, the obtained output is over 90% of the value at saturation. In the present invention, these principles are a guide to a method for determining a low coercive force card or a high coercive force card.

The following explains a detailed method for determining the coercive force of magnetic card 1. Control portion 10 determines the coercive force by running a program described below.

According to a first determination method shown in FIG. 5, after recording test data onto a data track of magnetic card 1 at a current corresponding to a low coercive force card (writing current appropriate for a low coercive force card), the recorded data are regenerated such that the card is determined to be a low coercive force card if the regenerated data are identical to the test data. Before recording the test data onto the data track at the given current, data which are previously recorded on the data track are regenerated for storing in order to protect them, and the stored data are recorded on the data track after determination of the coercive force.

More specifically, first, after taking into magnetic card 1 from card insertion slot 2 (step 31), data which are previously recorded on the data track of magnetic card 1 ("original data" hereafter) are read to be stored in original data memory 5 (step 32). Then, the test data are written onto the card at 22.5 mA 0-p, which is a current for writing onto a low coercive force card (step 33). Herein, the test data are different from the original data.

Afterward, the written test data are read (step 34). If magnetic card 1 which is inserted in the card reader is a low coercive force card, contents of the data track are written over by the test data such that the read data shall be identical to the test data. Therefore, by comparing the read data and the test data (step 35), if the two are identical, it is determined that magnetic card 1 is a low coercive force card (step 36). Then, this program is completed after writing the original data onto the data track at an appropriate current, that is, a current for a low coercive force card (step 38).

Also, in the case of writing the original data onto the data track, writing may be performed for data which are normally processed original data; or, the written original data can be processed based on the coercive force prior to recording of the data (writing of the original data can be performed in a similar manner in other determination methods).

On the other hand, if magnetic card 1 which is inserted in the card reader is a high coercive force card, the contents of the data track are written over by the test data such that the read data shall be different from the test data. Therefore, if the read data are different from the test data, magnetic card 1 is determined to be a high coercive force card (step 37); the program is completed after writing the original data onto the data track at an appropriate current for a high coercive force card (step 38).

As described above, writing of the data is performed at a writing current appropriate for each card after determining whether magnetic card 1 is a low coercive force card or a high coercive force card. Consequently, even though both high coercive force cards and low coercive force cards are used in the market, one card reader can process both kinds of magnetic cards.

Figure 6:
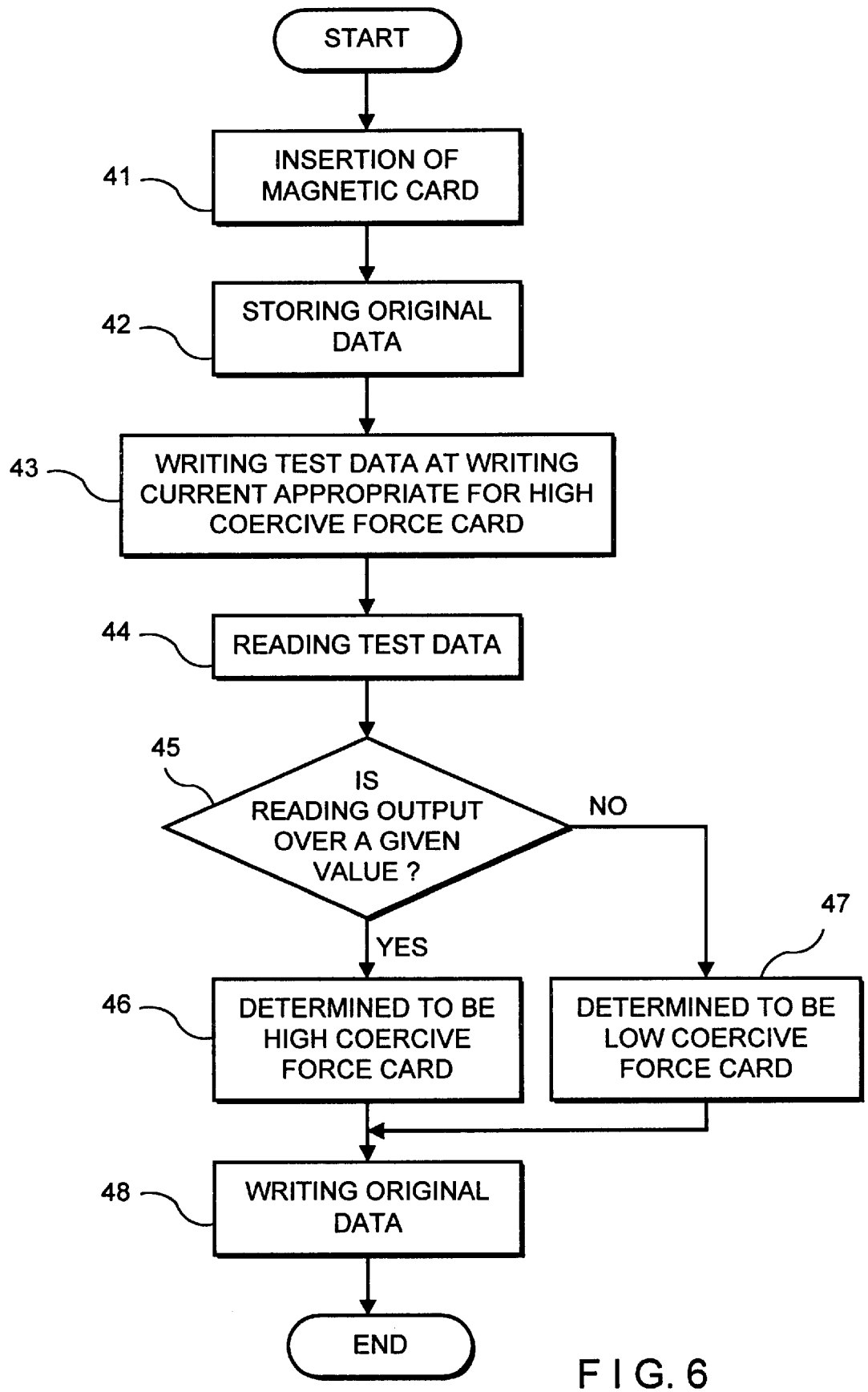
FIG. 6 is a flow chart of a second embodiment of a method for determining the coercive force of a magnetic force in a magnetic card reader according to the present invention.

The following explains a second method for determining the coercive force of a magnetic card in reference to FIG. 6. In this method, after recording the test data onto the data track of magnetic card 1 at a current corresponding to a high coercive force card (writing current appropriate for a high coercive force card), the card is determined to be a high coercive force card if the regeneration output obtained is above a given value. Also, the process in which the original data are read for storing prior to recording the test data onto the data track at a given current is the same as in the first method of determination.

To described the above in detail, first, magnetic card 1 is taken in from card insertion slot 2 (step 41) and the original data are read for being stored in original data memory 5 (step 42). Then, the test data are written onto the card at 200 mA 0-p, the current for writing a high coercive force card (step 43).

Then, the written test data are read (step 44). Herein, if magnetic card 1 inserted in the card reader is a high coercive force card, the test data shall be excellently written on the data track such that the reading output must be over a given value. Therefore, whether the reading output is over the given value is determined (step 45). If the reading output is higher than the given value, it is determined that magnetic card 1 is a high coercive force card (step 46) such that this program is completed after writing the original data (or their processed data) onto the data track at a current appropriate for a high coercive force card (step 48).

On the other hand, if magnetic card 1 inserted in the card reader is a low coercive force card, writing of the test data onto the data track shall be insufficient such that the reading output must be below the given value. In this case, it is determined that magnetic card 1 is a low coercive force card (step 47) such that this program is completed after writing the original data onto the data track at a current appropriate for a low coercive force card (step 48).

It is preferable that the given value in step 45 is established to, for example, 60% of the value at saturation, considering variation in the output of magnetic card 1.

The following describes a third method for determining the coercive force of a magnetic card in reference to FIG. 7. In this method, after erasing the data recorded on the data track of magnetic card 1, the test data are recorded at a current corresponding to a low coercive force card, then the card is determined to be a low coercive force card if the regeneration output is over a given value.

To describe the above in detail, first, magnetic card 1 is taken in from card insertion slot 2 (step 51) and the original data are read for being stored in original data memory 5 (step 52). Then, after the original data are DC-erased onto the card at 200 mA 0-p, the current appropriate for a high coercive force card (step 53), the test data are written onto the card at 22.5 mA 0-p, the current appropriate for a low coercive force card (step 54).

Thereafter, the written test data are read (step 55). Herein, if magnetic card 1 inserted in the card reader is a low coercive force card, the test data shall be excellently written on the data track such that the reading output must be over a given value. Therefore, whether the reading output is over the given value is determined (step 56). If the reading output is higher than the given value, it is determined that magnetic card 1 is a low coercive force card (step 57) such that this program is completed after writing the original data onto the data track at an appropriate current (step 59).

On the other hand, if magnetic card inserted in the card reader is a high coercive force card, writing of the test data onto the data track shall be insufficient such that the reading output must be below the given value. In this case, it is determined that magnetic card 1 is a high coercive force card (step 58) such that this program is completed after writing the original data onto the data track at an appropriate current (step 59).

Figure 8:
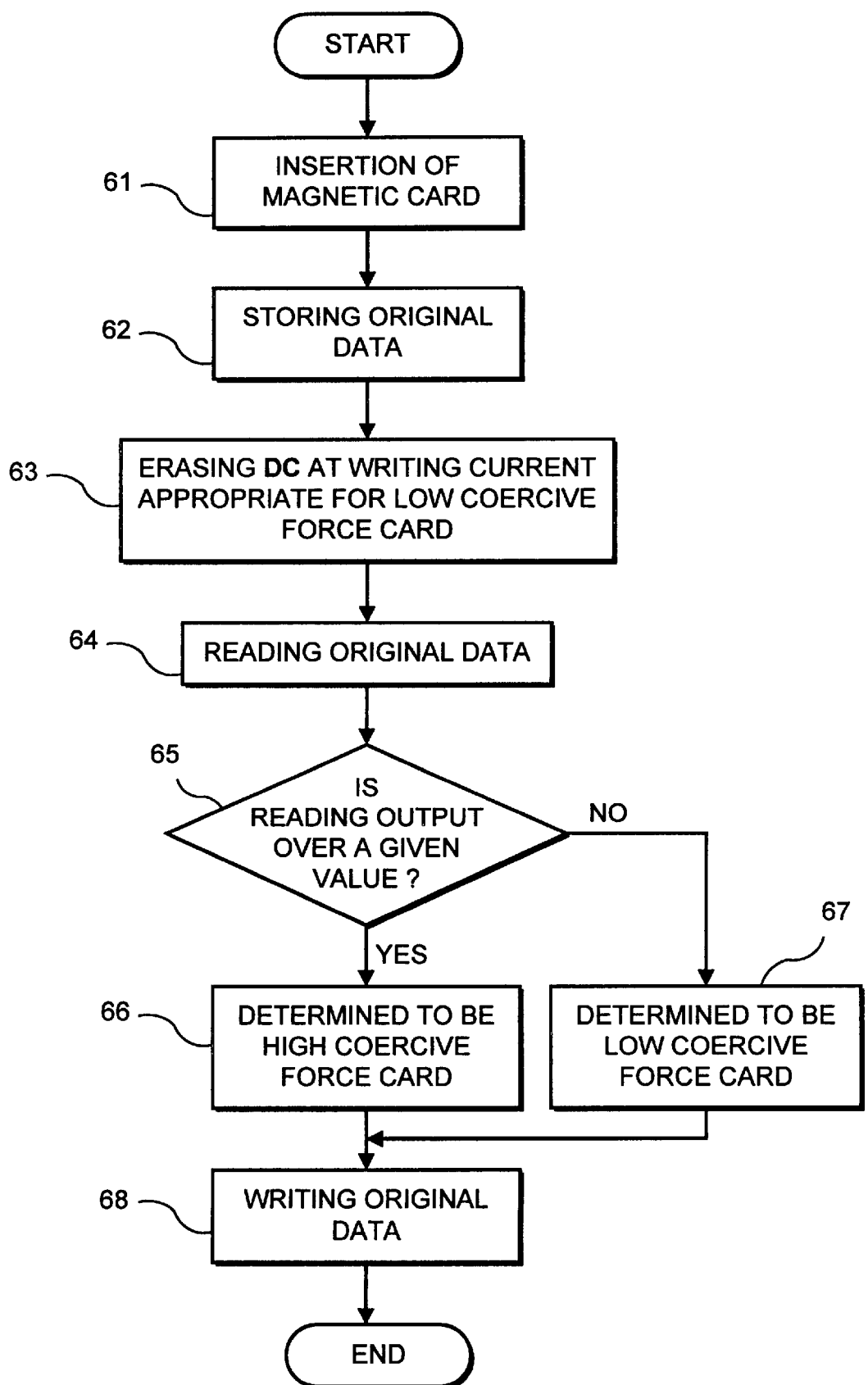
FIG. 8 is a flow chart of a fourth embodiment of a method for determining the coercive force of a magnetic force in a magnetic card reader according to the present invention.

The following describes a fourth method for determining the coercive force of a magnetic card in reference to FIG. 8. In this method, data recorded on the data track of magnetic card are erased at a current, at which only the data on a low coercive force card can be erased, and it is determined that the card is a high coercive force card if the regenerating output is over a given value.

To describe the above in detail, first, magnetic card 1 is taken in from card insertion slot 2 (step 61) and the original data are read for being stored in original data memory 5 (step 62). Then, after the original data are DC-erased onto the card at 22.5 mA 0-p, the current appropriate for a low coercive force card (step 63), the original data are read (step 64).

Herein, if magnetic card 1 inserted in the card reader is a high coercive force card, erasing of the data shall not be excellently performed at a writing current appropriate for a low coercive force card; as a result, the original data must remain thereon such that the reading output must be over the given value. Therefore, whether the reading output is over the given value is determined (step 65). If it is over the given value, it is determined that magnetic card 1 is a high coercive force card (step 65) such that this program is completed after writing the original data onto the data track at an appropriate current (step 68).

On the other hand, if magnetic card 1 inserted in the card reader is a low coercive force card, erasing of the original data is excellently performed such that the reading output must be below the given value. In this case, it is determined that magnetic card 1 is a low coercive force card (step 67) such that this program is completed after writing the original data onto the data track at an appropriate current (step 68).

The above embodiments are preferred examples of the present invention; however, one is not limited to these but various modifications are applicable within the scope of the objective of the present invention. For example, in the above embodiments, the card reader intends to distinguish a card of 300 (Oe) as a low coercive force card and a card of 2,750 (Oe) as a high coercive force card; however, the range of the coercive force is not limited to the above.

Also, in the above embodiments, reading, writing and erasing are carried out by one magnetic head 3; however, they can be performed by separate magnetic heads. In this case, all the processes can be carried out in one card driving.

Furthermore, in the above embodiments, recording of the original data is carried out prior to determination of the coercive force of a magnetic card; however, the steps of recording the original data and writing can be omitted if it is unnecessary to record the original data.

The following describes embodiments in which the coercive force is determined based on a fact that static characteristics of a magnetic head vary depending on whether or not a magnetic card exists therein or on differences in the coercive forces.

Static characteristics of a magnetic head vary depending on whether or not a magnetic card exists therein or on differences in the coercive force. Therefore, a data track of a magnetic card is placed across from the magnetic head after the card is inserted from a card insertion slot, static characteristics of the magnetic head vary according to values corresponding to the coercive force of the data track. As a result, the coercive force of the data track can be determined based on the change in static characteristics of the magnetic head such that data can be written onto the data track at a current appropriate for the coercive force.

Figure 9:
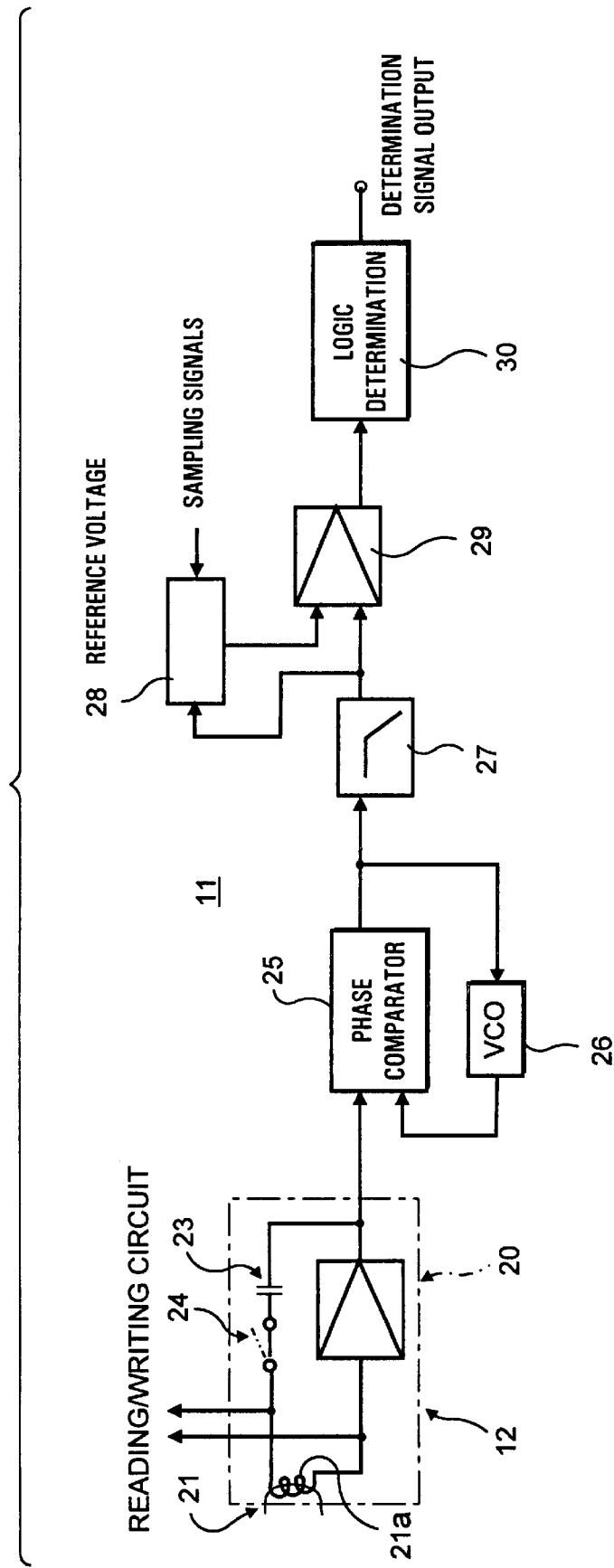
FIG. 9 is a block diagram showing another embodiment of a magnetic card reader according to the present invention.

FIG. 9 shows an embodiment using changes in static characteristics of the magnetic head wherein magnetic information on a magnetic card inserted from the card insertion slot is read or written by magnetic head 21; a card reader or this embodiment comprises determining means 11 which determines the coercive force of the data track in order to write the magnetic information. Determining means 11 comprises detecting portion 12 which detects changes in static characteristics of magnetic head 21 when being placed across from the magnetic card.

Detecting portion 12 comprises oscillator circuit 20, which has condenser 23 connected to coil 21 a and coil 21 a as a part thereof; determining means 11 determines the coercive force of the data track by comparing the output of oscillator circuit 20 to reference signals. Also, the reference signals are established based on the signals of oscillator circuit 20 when the magnetic card is not placed across from magnetic head 21. These reference signals are different from values of the output from the oscillator circuit when the magnetic card is placed across from magnetic card 21 such that the coercive force of the data track can be determined by comparing the output of the oscillator circuit when the magnetic card is placed across from magnetic head 21 with the reference signals.

Magnetic head 21 of detecting portion 12 is connected to oscillator circuit 20 together with condenser 23. Magnetic head 21 and condenser 23 are used as a part of a constant for determining oscillation frequency. Also, switch for stopping oscillation 24 is formed between magnetic head 21 and condenser 23.

The output of oscillator circuit 20 is phase-compared with the output of voltage-controlled oscillator (VCO) 26 in phase comparator 25. A phase difference (error) of the output of oscillator circuit 20 and the output of VCO 26 compared in phase comparator 25 is entered to reference voltage 28 and differential amplifier 29 via low-pass filter (LPF) 27. Reference voltage 28 has the function of sample holding to hold a level of signals for arbitrary timing of the output of LPF 27 by sampling signals. The sampling signals are provided as pulse signals immediately prior to the magnetic card contacting magnetic head 21; then, the output voltage level of LPF 27 is held in relation to reference voltage 28, and, in turn, becomes a reference voltage.

Differential amplifier 29 is a direct current amplifier. Logic determination portion 30, comprising a comparator and the like, monitors the differentially amplified output voltage of the differential amplifier and determines whether the output is a voltage corresponding to a high coercive force card or low coercive force card such that binary signals can be provided.

The following describes a principle for determining the coercive force of a magnetic card based on static characteristics of the magnetic head.

Figure 10:
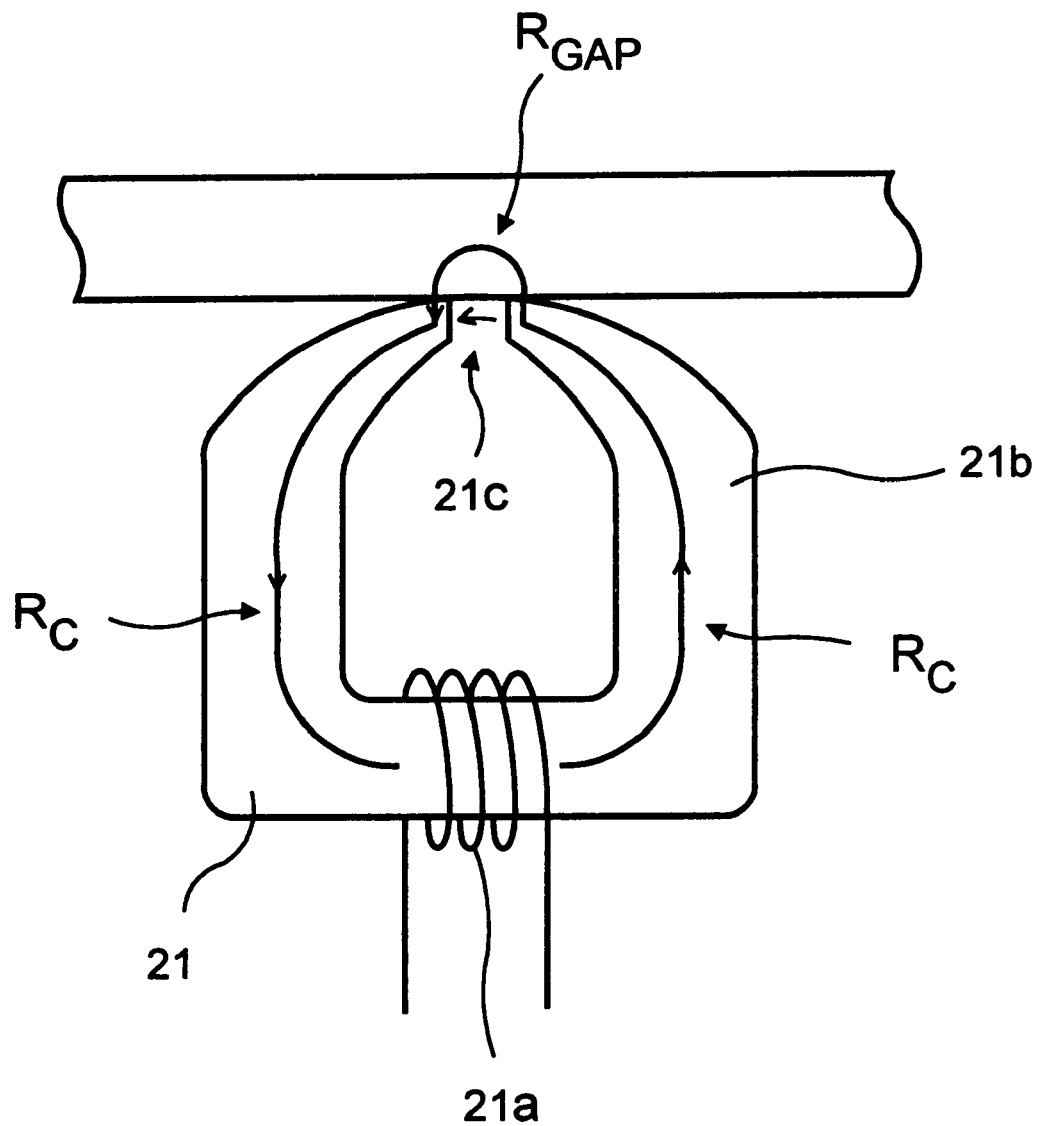
FIG. 10 is a schematic configuration of a magnetic head of the magnetic card reader of FIG. 9.

Magnetic head 21, as shown in FIG. 10, is structured such that coil 21*a* is wound around magnetic core 21*b* made of materials such as Sendust and permalloy wherein its magnetic path is discontinued by gap portion 21*c* on the driving plane of magnetic card 1. Inductance L of magnetic head 21 can be expressed as:

$$L (4\pi N^2 \times 10^{-6})/(R_C + R_{GAP})$$

when:

N=number of turns of coil 21*a*;

$R_C$=magnetic reluctant of magnetic core 21*b*; and $R_{GAP}$=magnetic reluctant of gap portion 21*c*.

Magnetic reluctant of gap portion 21*c* $R_{GAP}$ varies depending on whether or not magnetic card exists therein or on differences in permeability of the data track (magnetic body) of the magnetic card. When magnetic reluctant $R_{GAP}$ varies, inductance L varies accordingly such that it is true that inductance L varies depending on differences in the coercive force of the data track. In actual measurement, for example, inductance L is 4.50 mH when the magnetic head is placed across from a high coercive force card (2,750 (Oe)), and 4.54 mH when the magnetic head is placed across from a low coercive force card (300 (Oe)) in an example of a head corresponding to a readable/writable high coercive force card. Since inductance L varies according to the coercive force, it is possible to determine whether magnetic card 1 is a high coercive force card or a low coercive force card by comparing inductance L with the reference signals.

In this method for determining the coercive force of a magnetic card, the coercive force of the data track is determined by comparing the static characteristics of a magnetic head, when being placed across from magnetic card 1, with the reference signals. Also, coil 21*a*, wound around magnetic head 21, is formed as a part of oscillator circuit 20, and the reference signals are established based on signals of oscillator circuit 20 immediately prior to magnetic card 1 being placed across from magnetic head 21.

In other words, inductance L of magnetic head 21 varies according to the coercive force of magnetic card 1 such that oscillation frequency generated by oscillator circuit 20 varies based on whether magnetic card 1 is a high coercive force card or a low coercive force card.

Prior to insertion of magnetic card 1, the error signals provided by phase comparator 25 are already at a stable voltage. However, there is a phase difference between the two signals which are entered into phase comparator 25 due to insertion of magnetic card 1, that is, the signals from oscillator circuit 20 and the signals from VCO 26. This phase difference is differentially amplified as a voltage signal. The output signals amplified by differential amplifier 29 vary depending on whether inserted magnetic card 1 is a high coercive force card or a low coercive force card; therefore, the coercive force of magnetic card 1 can be determined by determining by which kind of magnetic card 1 causes the voltage level. Also, the differential amplifying is carried out in reference to the voltage of LPF output immediately prior to insertion of magnetic card 1 such that [the voltage level] can be correctly determined even when there is a fluctuation in the characteristics of magnetic head 21 or in the oscillation frequency due to disturbance noises.

Furthermore, the above embodiment is a preferable example of the present invention; however, one is not limited to above, and various modifications can be applied within the scope of the present invention. For example, determination is carried out by defining a change in inductance L as a change in the oscillation frequency; however, it is possible to directly use a change in inductance L or to define it as a change in impedance.

Moreover, in the above description, one magnetic head 1 performs normal reading/writing and determination of the coercive force; however, it is possible to form a separate head for determining the coercive force such that both determination and reading/writing can be performed in one driving of a card.

As described above, according to the magnetic card reader of the present invention, a determining means to determine the coercive force of the data track for recording magnetic information is formed such that differentiation of a magnetic card is performed even when magnetic cards with different the coercive forces are used. Furthermore, data can be written at a writing current appropriate for each kind of card.

Additionally, according to the method for determining the coercive force of a magnetic card of the present invention, the coercive force of the data track is determined by a regeneration output of data after recording or erasing the data at a given current on/from the data track by the magnetic head in a magnetic card reader in which magnetic information formed on a card inserted from a card insertion slot is regenerated or recorded by the magnetic head. Therefore, the coercive force of the magnetic card can be determined based on the relationship between the current value at which the data are recorded or erased and the regeneration output value.

Moreover, the coercive force of the magnetic card can be determined based on changes in static characteristics of the magnetic head. As a result, even when it is not known whether the magnetic card is a high coercive force card or a low coercive force card, it can be automatically determined such that writing is performed at a current appropriate for each card.

While the foregoing description and drawings represent the preferred embodiments of the present invention, it will be obvious to those skilled in the art that various changes and modifications may be made therein without departing from the true spirit and scope of the present invention.

What is claimed is:

1. A method for determining the coercive force of a magnetic card in a magnetic card reader in which magnetic information formed on a card to be inserted from a card insertion slot is regenerated or recorded by a magnetic head comprising the steps of:

first recording or erasing data onto or from a data track by said magnetic head at a given current; and then determining the coercive force of said data track by the regeneration output of said data, in which after recording test data onto said data track at a current corresponding to a low coercive force card, said test data are regenerated such that said card is determined to be a low coercive force card if said regenerated data are identical to said test data.

2. A method for determining the coercive force of a magnetic card in a magnetic card reader in which magnetic information formed on a card to be inserted from a card insertion slot is regenerated or recorded by a magnetic head comprising the steps of:

first recording or erasing data onto or from a data track by said magnetic head at a given current; and then determining the coercive force of said data track by the regeneration output of said data, in which after recording test data onto said data track at a current corresponding to a high coercive force card, said test data are regenerated such that said card is determined to be a high coercive force card if said regenerated output is higher than a given value.

3. A method for determining the coercive force of a magnetic card in a magnetic card reader in which magnetic information formed on a card to be inserted from a card insertion slot is regenerated or recorded by a magnetic head comprising the steps of:

first recording or erasing data onto or from a data track by said magnetic head at a given current; and then determining the coercive force of said data track by the regeneration output of said data, in which after erasing data recorded on said data track, test data are recorded on said data track at a current corresponding to a low coercive force card such that said card is determined to be a low coercive force card if regenerated output is higher than a given value.

4. A method for determining the coercive force of a magnetic card in a magnetic card reader in which magnetic information formed on a card to be inserted from a card insertion slot is regenerated or recorded by a magnetic head comprising the steps of:

first recording or erasing data onto or from a data track by said magnetic head at a given current; and then determining the coercive force of said data track by the regeneration output of said data, in which recorded data recorded on said data track are erased at a current, at which only data on a low coercive force card are erasable, such that said card is determined to be a high coercive force card if regenerated output on said data track is higher than a given value.

5. A magnetic card reader comprising:

a card insertion slot;

a magnetic head for regenerating or recording magnetic information formed on a card to be inserted in said card insertion slot; and a determining means to determine coercive force of a data track for recording magnetic information of said card, in which said determining means comprises a detecting portion which detects a change in static characteristics of said magnetic head when said magnetic head is positioned across from said card.

6. The magnetic card reader described in claim 5 in which said detecting portion has a coil wound around said magnetic head as a part of an oscillator circuit such that said determining means determines the coercive force of said data track by comparing output from said oscillator circuit with a reference signal.

7. The magnetic card reader described in claim 6 in which said reference signal is established based on output of said oscillator circuit when said card is not positioned across from said magnetic head.

8. The magnetic card reader described in claim 6 in which said coil is for reading and/or writing of said magnetic head.

9. A method for determining the coercive force of a magnetic card in a magnetic card reader in which magnetic information formed on a card to be inserted from a card insertion slot is regenerated or recorded by a magnetic head comprising the steps of:

providing a detecting portion which detects a change in static characteristics of said magnetic head; and determining the coercive force of a data track by comparing output from said detecting portion, which detects a change in static characteristics of said magnetic head while being positioned across from said card, with a reference signal.

10. The method for determining the coercive force of a magnetic card in a magnetic card reader described in claim 9 in which a coil wound around said magnetic head is formed as a part of an oscillator circuit such that said reference signal is established based on the output of said oscillator circuit when said card is not positioned across from said magnetic head.

11. The method for determining the coercive force of a magnetic card in a magnetic card reader described in claim 10 in which said coil is for reading and/or writing by said magnetic head.

12. The method of claim 1 in which prior to recording or erasing data onto or from said data track by said magnetic head at said given current, said data on said data track are regenerated for storing by regeneration such that said stored data are recorded on said data track after determination of said coercive force.

13. The method of claim 2 in which prior to recording or erasing data onto or from said data track by said magnetic head at said given current, said data on said data track are regenerated for storing by regeneration such that said stored data are recorded on said data track after determination of said coercive force.

14. The method of claim 3 in which prior to recording or erasing data onto or from said data track by said magnetic head at said given current, said data on said data track are regenerated for storing by regeneration such that said stored data are recorded on said data track after determination of said coercive force.

15. The method of claim 4 in which prior to recording or erasing data onto or from said data track by said magnetic head at said given current, said data on said data track are regenerated for storing by regeneration such that said stored data are recorded on said data track after determination of said coercive force.

16. The method of claim 5 in which prior to recording or erasing data onto or from said data track by said magnetic head at said given current, said data on said data track are regenerated for storing by regeneration such that said stored data are recorded on said data track after determination of said coercive force.

\* \* \* \* \*